United States
Borel et al.

[11] 3,843,231
[45] Oct. 22, 1974

[54] LIQUID CRYSTAL DIFFRACTION GRATING

[75] Inventors: Joseph Borel, Echirolles; Jean-Claude Deutsch, Grenoble; Guy Labrunie, Seyssinet; Jacques Robert, Grenoble, all of France

[73] Assignee: Commissariat A L'Energie Atomique, Paris, France

[22] Filed: Feb. 14, 1973

[21] Appl. No.: 332,286

Related U.S. Application Data
[62] Division of Ser. No. 245,238, April 18, 1972, Pat. No. 3,741,716.

[30] Foreign Application Priority Data
Apr. 22, 1971 France .................... 71.14399

[52] U.S. Cl. ............... 350/160 LC, 350/162 R
[51] Int. Cl. ............................... G02f 1/16
[58] Field of Search..... 350/160 LC, 162 R, 162 ZP

[56] References Cited
UNITED STATES PATENTS
3,402,001  9/1968  Fleisher.................. 350/162 ZP Primary Examiner—Edward S. Bauer
Attorney, Agent, or Firm—Cameron, Kerkam, Sutton, Stowell & Stowell

[57] ABSTRACT

The device comprises at least one liquid-crystal cell placed on the path of the beam and constituted by a film of liquid crystals interposed between two walls provided with electrodes between which a potential difference can be applied by suitable means. The incidence of the light beam is oblique with respect to the first wall-liquid crystal interface which is encountered. Use is made of liquid crystals for which the direction of propagation of the light beam is dependent on the potential difference applied between the electrodes.

2 Claims, 8 Drawing Figures

LIQUID CRYSTAL DIFFRACTION GRATING

This is a Division, of application Ser. No. 245,238, filed Apr. 18, 1972, now U.S. Pat. No. 3,741,716.

This invention relates to a device for deflecting a light beam, that is to say a device which is capable of modifying the path of light rays under the control of suitable means. The invention finds an application in the construction of addressing devices intended for use especially in electro-optical storage devices.

Devices for deflecting a light beam which make use of acoustic means are already known and consist in generating a system of acoustic waves within a material so as to form a diffraction pattern. These devices are costly since they entail the need for high frequencies and reactive powers as well as expensive materials and assembly systems.

A second known type of device is concerned with the electro-optical deflection of a light beam in which the Pockels effect or Kerr effect is utilized to advantage. The optical indices of the media employed vary with the electric field which is applied thereto. It is possible to obtain a variable angle of deflection, either continuously by means of an electro-optical prism, for example, the angle of deviation being proportional to the index of the medium, or non-continuously by means of an electro-optical modulator (KDP crystal, for example) and a birefringent crystal (Wollaston or calcite prism, for example). However, the Kerr and Pockels constants are of fairly low value, with the result that the angle of deflection is small and these deflectors call for fairly high values of electrical control power. By way of example, an electric field of 5 kV/cm applied to a KDP crystal causes a variation in optical index of the crystal of $9 \times 10^{-6}$ for a wavelength of the incident light beam of 0.5 $\mu$.

This invention proposes a device which meets practical requirements more effectively than like devices of the prior art, especially by utilizing relatively low values of electric power for controlling the deflection.

More precisely, the present invention relates to a device for deflecting a light beam, comprising at least one liquid-crystal cell placed on the path of said beam and constituted by a film of liquid crystals interposed between two walls fitted with electrodes between which a potential difference can be applied by suitable means, wherein the incidence of said light beam is oblique with respect to the first wall-liquid crystal interface encountered and that use is made of liquid crystals in which the direction of propagation of the light beam is dependent on the potential difference applied between said electrodes.

In accordance with a first alternative embodiment of the invention, the deflection device employs liquid crystals having an index of refraction which is dependent on the potential difference applied.

In a second embodiment, the liquid crystals employed are of the type in which the molecular stacking is periodic, the pitch of the stack being dependent on the potential difference applied.

In order that the invention may be more readily understood, several embodiments thereof are described below solely by way of non-limiting illustrative examples with reference to the accompanying drawings, wherein.

It is known that liquid crystals are complex organic substances having the properties both of liquids and crystals within a predetermined temperature range. In other words, they have a high degree of fluidity and their molecules are disposed in an ordered state, with the result that their arrangement forms a structure which is similar to that of crystal lattices. The liquid crystals which are sometimes designated as mesomorphous substances can be considered to fall in three classes, depending on their molecular arrangement relative to each other, namely smectic, nematic and cholesteric liquid crystals. The molecules of liquid crystals have an elongated shape and can possess a permanent electric dipole moment, thereby permitting molecular orientation by means of a constant or alternating electric field.

Liquid crystals are usually transparent in the case of small thicknesses. However, by subjecting the crystals to an electric field of sufficiently high value, there takes place a displacement of ions and/or of electrically charged impurities which results in turbulent motion of the molecules and the liquid crystals become opaque. This property is utilized in the fabrication of display devices.

If the applied electric field is insufficient to produce turbulences, it is nevertheless possible to utilize the properties of optical anisotropy of liquid crystals as is the case in the present invention, in order to produce light-deflecting devices.

In general, a liquid-crystal cell comprises two transparent walls forming a plate which may or may not have parallel faces, the wall which receives the incident light beam being transparent and forming the entrance wall, a small thickness of liquid crystals usually contained either by capillarity or by means of seals between the two walls, and means for modifying the optical properties of the liquid crystals. In the invention, it is important to ensure that the application of the means for modifying the optical properties does not give rise to any movement of the ions and impurities contained within the liquid crystals in order that turbulent movements within the liquid should not be set up, as this would have the effect of reducing the transparency of the liquid crystals. Said means for modifying the optical properties can advantageously be an electric field. The applied field can be constant and can have an intensity which is below a threshold value at which turbulent movements within the liquid are generated. Alternatively the applied field can be alternating and have a frequency above a threshold frequency, the electrically charged impurities and ions being set into turbulent motion at a frequency below said threshold frequency. In the invention, the modification of optical properties is applied to the direction of propagation of the light beam.

Figure 1:
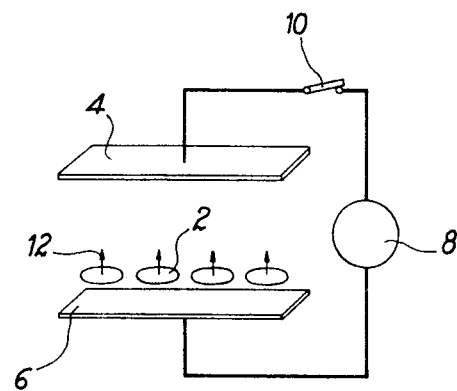
FIG. 1 illustrates the principle of the first alternative embodiment of the invention.

In FIG. 1, the liquid crystal molecules 2 are contained in a cell represented diagrammatically by a pair of oppositely-facing electrodes 4 and 6 which form the plates of a capacitor. A potential difference can be applied between these two electrodes by means of a voltage generator 8 and a switch 10. It has been assumed, solely by way of explanation, that the dipole moment represented by the arrows 12 is perpendicular to the major axis of the liquid crystal molecules. The application of a potential difference to the electrodes 4 and 6 produces an electric field which orients the dipole moments in volume. The axes of the molecules nevertheless remain randomly oriented in planes parallel to the electrodes. The appearance of the cell is always isotropic but the structure of the liquid crystals has been modified since a mean orientation of the molecules has been created. The optical index has therefore changed. It is this phenomenon which forms the basis of the first alternative embodiment of the device according to the invention, which utilizes the modifications in refractive index of a film of liquid crystals under the action of an electric field. The liquid crystals employed in this alternative form are preferably those of the nematic type.

Figure 2:
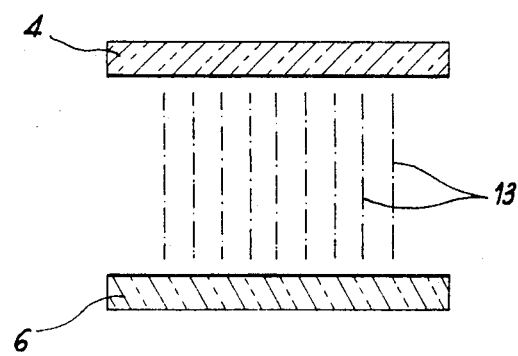
FIG. 2 illustrates the principle of the second alternative embodiment of the invention.

There is shown diagrammatically in FIG. 2 a cell utilizing liquid crystals of the type in which molecular stacking is periodic. It is known that the family of cholesteric crystals is of this type. In FIG. 2, the molecules are assumed to be located in planes 13 at right angles to the electrodes 4 and 6. The pitch of the structure is the distance between two planes in which the molecules have rotated through an angle of 180°. A light beam which passes through the film of liquid crystals encounters zones having different orientations and therefore different indices. The cell is therefore a lattice of indices.

The action of the electric field deflects the planes of the periodic structure and modifies the apparent pitch of the cell. In accordance with this second embodiment of the invention, the conditions of diffraction of the light in the film of liquid crystals are therefore modified and this in turn modifies the direction of propagation of the light beam.

Figure 3:
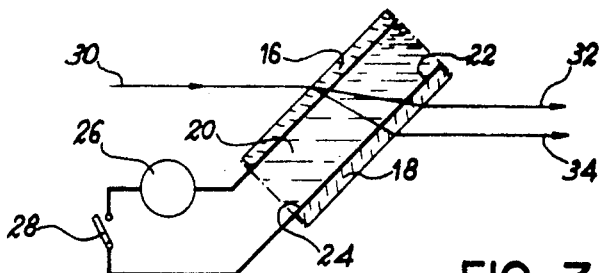
FIG. 3 shows an embodiment of the invention which can comprise a plurality of alternative forms of construction, the light beam being transmitted through the liquid-crystal cell.

There is shown in FIG. 3 an alternative arrangement involving the use of liquid crystals whose index of refraction depends on the potential difference applied between the electrodes of the cell. This device comprises a liquid-crystal cell composed mainly of two glass plates 16 and 18 forming a plate unit which may or may not have parallel faces. A thin layer of liquid crystal 20 is contained between said two faces either by capillarity or by means of seals. The glass plates 16 and 18 form respectively the entrance and exit walls of the cell. There is deposited on each internal face of the plates 16 and 18 a thin film 22 or 24 of electrically conductive and transparent material such as indium oxide or stannic oxide, for example. The films 22 and 24 form electrodes in contact with the liquid crystals 20. A potential difference can be established between these two electrodes by means of a voltage generator 26 and a switch 28, thereby making it possible to produce an electric field substantially at right angles to the plates 16 and 18. The value of the applied potential difference when this latter is constant must be smaller than a threshold value at which turbulent movements arising from the migration of ions or electrically charged impurities appear in the liquid crystal 20. When the potential difference is alternating, its frequency must be higher than a threshold frequency below which turbulent movements take place. The incident light beam 30 impinges on the entrance window 16 at an oblique angle of incidence. The deflection of the beam 30 results from the variation in refractive index of the liquid crystal 20 arising from the application of said potential difference as a result of closure of the switch 28. At the outset, when said switch is open, the molecules of the liquid crystal are completely disoriented and the incident beam passes out of the cell in the form of the emergent beam 32. At the time of closure of the switch 28, the molecules acquire a mean orientation, which results in a variation in the mean optical index of the liquid crystal 20. The angle of deflection to which the incident light beam 30 is subjected as it passes into the crystal 20 is larger than in the case of a zero field and there is obtained another emergent beam 34 which is displaced with respect to the emergent beam 32. There are thus obtained two stable positions of the emergent beam as represented in FIG. 3 by the emergent beams 32 and 34.

Figure 4A:
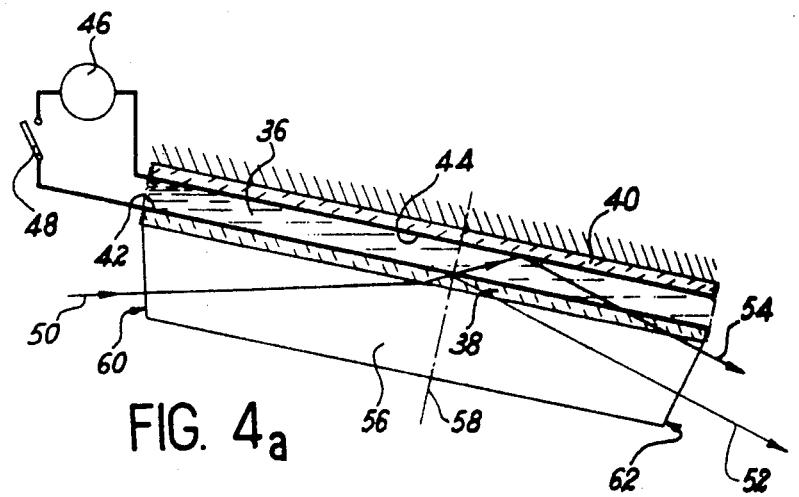
FIGS. 4a and 4b show two embodiments of the invention in which the incident light beam is reflected.

The device which is illustrated in FIG. 4a shows another embodiment of the invention. The principle of operation of this device is again based on the variation in refractive index of the liquid crystal 36. This crystal is contained in a thin film between two glass plates 38 and 40. The first glass plate forms the entrance wall of the device and is provided with a transparent electrode 42 constituted by a conductive deposit on the internal wall of the plate 38. The second glass plate 40 is provided with an electrode 44 constituted by a reflecting conductive layer which is deposited on the internal wall of the plate 40. The reflecting layer 44 and the plate 40 thus form a mirror. By means of a switch 48, a voltage generator 46 serves to establish a potential difference between the two electrodes 42 and 44 ; said potential difference can be either constant or alternating. In the former case, its value is lower than a threshold value at which turbulent movements appear within the liquid crystal 36. In the latter case, the frequency of said potential difference is higher than a threshold frequency below which said turbulent movements appear. The incident light beam 50 impinges on the entrance face 38 at an oblique angle of incidence. When the switch 48 is open, the angle of incidence of the light beam 50 with respect to the interface between the wall 38 and the liquid crystals 36 is such that there is total reflection of the incident beam from the interface. Under strict conditions, this total reflection takes place in the liquid crystals 36. When a potential difference is established between the two electrodes 42 and 44 by closing the switch 48, there takes place an increase in the refractive index of the liquid crystal 36. The incident light beam 50 then passes into the liquid crystals and is reflected from the reflecting layer 44. There are thus obtained two emergent light beams 52 and 54 corresponding respectively to the absence and to the presence of an electric field within the liquid crystal.

The conditions $n_1 < n_s \sin \theta < n_2$ and $n_1 < n_s < n_2$, in which $n_1$ and $n_2$ are the two extreme indices which can be assumed by the liquid crystal, $n_s$ is the index of the electrode and θ is the angle of incidence of the light beam on the liquid crystal, are accordingly satisfied.

In this device, it is an advantage to replace the glass plate which forms the entrance wall of the cell by a block 56 which is fabricated from transparent material. This block 56 is advantageously given the shape of an isosceles prism which is truncated along two planes which are parallel to each other and perpendicular to the height 58 of the prism. The large base of said truncated prism accordingly constitutes the entrance window of the liquid-crystal cell. The angle at the vertex of the prism is advantageously calculated so that the incident light beam 50 passes through the face 60 of the block 56 at a normal incidence. Since the prism is isosceles, the emergent beams 52 and 54 pass out through the face 62 of the block 56 also at a normal incidence. As can be noted, it is possible to obtain on the one hand any relative spacing between the two emergent beams 52 and 54 by varying the distance between the two plates 38 and 48 and, on the other hand, to modify the deflection obtained by varying the angle of inclination of the wall 40.

Figure 4B:
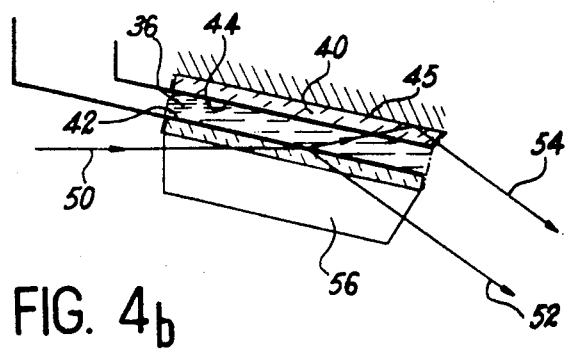

Should it be desired to increase the relative spacing between the beams 52 and 54, the device of FIG. 4b can advantageously be adopted. In this device, the conductive deposit 44 is transparent ; the reflecting surface 45 is located behind the film of liquid crystals 36 and at any desired distance. In particular, the reflecting surface can be constituted by a reflecting film 45 which is deposited on the rear face of the exit wall 40.

Figure 5:
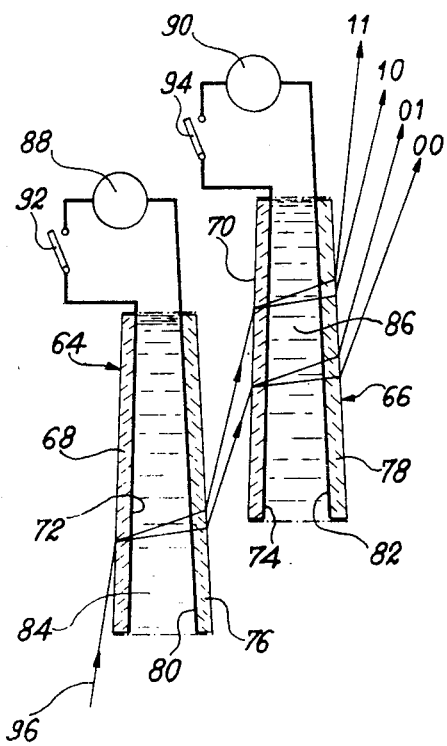
FIG. 5 shows an embodiment of the invention comprising two liquid-crystal cells placed in cascade.

The devices of FIGS. 3 and 4 are designed in such manner as to have parallel plates but prismatic devices also form part of the invention, in which case the two directions of the emergent beams are no longer parallel. It is also possible to associate a plurality of identical stages in order to increase the number of possible positions of the emergent light beam. This has been shown by way of example in FIG. 5, in which each cell 64 or 66 has the shape of a portion of prism having a very small angle at the vertex. The cells 64 and 66 are each provided respectively with an entrance face 68 or 70 fitted with a transparent electrode 72 or 74 and an exit face 76 or 78 fitted with a transparent electrode 80 or 82. Two thin films 84 and 86 of liquid crystals are contained between the entrance and exit faces of the cells. Two voltage generators 88 and 90 and two switches 92 and 94 serve to subject the liquie crystals 84 and 86 to an electric field. The first deflection cell 64 provides two stable positions of the emergent beam and the cell 66 therefore provides four positions of the emergent beam which are designated in FIG. 5 by the references 00, 01, 10 and 11. The second cell 66 is inclined at a small angle with respect to the first in such manner as to ensure that either of the two light beams impinges on the entrance face 70 at a grazing angle of incidence which is as small as possible.

Figure 6:
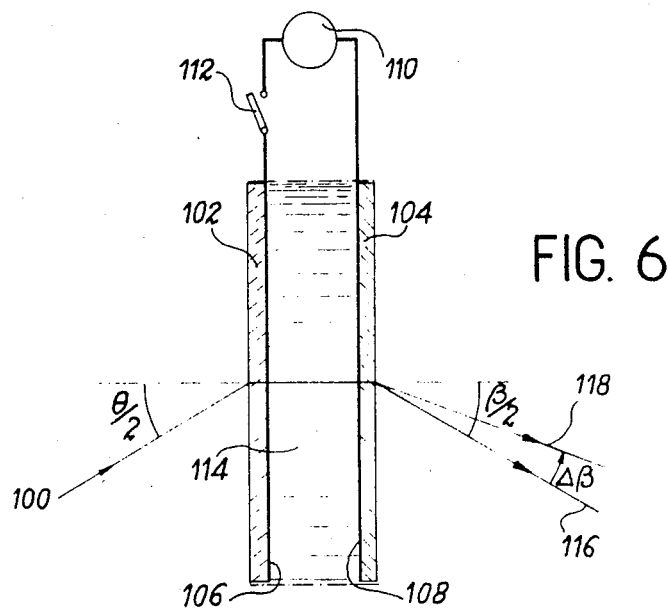
FIG. 6 shows an embodiment of the invention in accordance with the second alternative form entailing the use of a cell in which the incident beam is diffracted.

In FIG. 6, there is shown a device for deflecting a light beam in accordance with the second alternative embodiment of the invention, namely which utilizes the phenomenon of diffraction caused by the periodic structure of certain liquid crystals.

In this figure, a light beam 100 is directed onto a cell constituted as shown diagrammatically by two transparent walls 102 and 104 on which are deposited transparent electrodes 106 and 108. A voltage generator 110 associated with the switch 112 serves to apply a potential difference between the electrodes 106 and 108.

A liquid crystal film 114 is disposed between the walls 102 and 104. These liquid crystals are of the type in which molecular stacking is periodic, the pitch of said periodic stack being dependent on the electric field to which the liquid crystals are subjected. Under these conditions, the light beam 100 encounters zones having a variable optical index and is diffracted by the index lattice which is constituted by the film 114. In the case of zero voltage applied to the electrodes, the emergent beam is designated by the reference 116. The angle of emergence β/2 can be calculated by means of conventional diffraction laws on the basis of the lattice pitch p and of the angle of incidence θ/2. When a potential difference is applied between the electrodes 106 and 108, the planes of the molecular stack are deflected and the pitch varies by a quantity Δp which modifies the angle of emergence by a quantity Δβ. The new emergent beam is designated by the reference 118. Taking by way of example the particular case of the Bragg region in which β = θ and sin β/2 = 1/2p , wherein λ is the wavelength of the light beam, we have :

$$\Delta \beta = \frac{\lambda}{2p^2 \cos \frac{\beta}{2}} \Delta p$$

the variation in pitch being a function of the applied voltage, the difference Δβ is also dependent on said voltage, with the result that the deflection is in an analog form.

The liquid crystals 114 can be of the cholesteric type in which the molecular stack is twisted and therefore periodic. Nevertheless, in the majority of cholesteric crystals, the electric dipole moment of the molecule is very small or ill-defined. In this case, the film 114 is formed by a mixture of nematic liquid crystals having a dipole moment and by cholesteric liquid crystals. The dipole moment of the film 114 is given by the nematic crystals and the periodic arrangement by the cholesteric crystals. The action of the electric field is then possible on the cholesteric crystals by means of the nematic crystals. These nematic crystals can be such that the diple moment is either parallel or perpendicular to the major axis of the molecule. In addition to this action, nematic crystals reduce the viscosity of cholesteric crystals and increase the speed of response of the deflecting device.

As already stated in connection with FIG. 2, good operation of the device of FIG. 6 assumes that, in the absence of potential difference between the electrodes 106 and 108, the planes of the cholesteric crystal stacks are perpendicular to said electrodes. In order to obtain this situation, the electrodes 106 and 108 are surface treated in order that the longitudinal axis of the nematic liquid crystal molecules should be aligned at right angles to said surfaces.

Among the liquid crystals which are suitable for this alternative embodiment of the invention, mention can be made by way of example of methoxy-benzilidene-butylaniline (in short MBBA) which is of the nematic type, and cholesteryloleyl-carbonate, which is of the cholesteric type.

Figure 7:
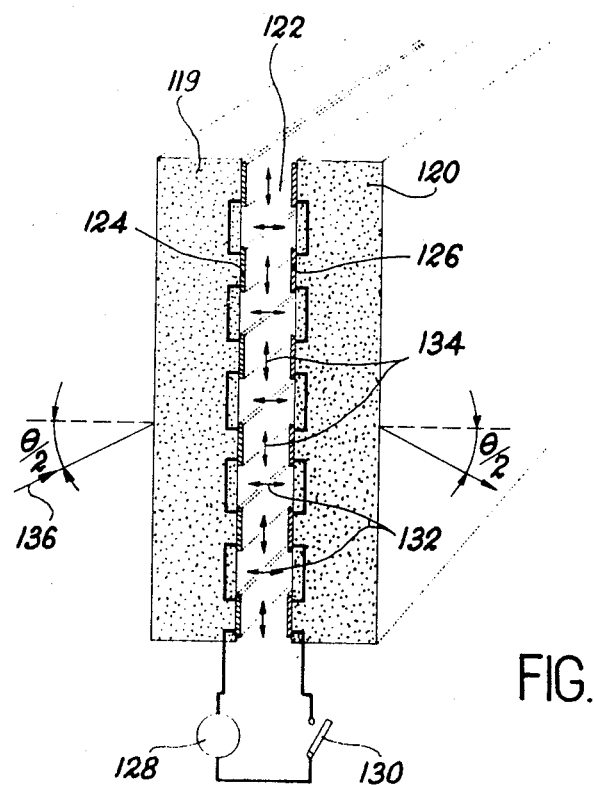
FIG. 7 shows an embodiment of the invention according to the first alternative form entailing the use of a cell in which the electrodes are disposed in parallel strips and in which the beam is diffracted.

The embodiment which is shown diagrammatically in FIG. 7 comprises two transparent glass plates 119 and 120 forming a plate until having parallel faces. Liquid crystals 122 are contained in a thin film between the two plates 118 and 120. Electrodes 124 and 126 are deposited on the internal walls of these two plates and are each constituted by an array of identical conductive and transparent strips in parallel and uniformly spaced relation, the distance between two adjacent strips being equal to the width of each strip. Said strips are preferably formed of conductive and transparent metallic oxides. The electrodes 124 and 126 are identical, with the result that a conductive strip of one array is located opposite to a conductive strip of the other array. All the strips of the same array are interconnected electrically. A generator 128 and a switch 130 are employed in order to establish a potential difference between the two electrodes 124 and 126, and said potential difference does not set the liquid crystals 122 into turbulent motion. The internal walls of the entrance and exit windows constituted respectively by the glass plates 118 and 120 are treated in such manner that, in the absence of any electric field, the optical axis of the liquid crystals should be either parallel or perpendicular to the internal walls. By subjecting the liquid crystals 122 to an electric field, the optical axis undergoes a movement of rotation between the electrodes. FIG. 7 shows a liquid-crystal cell which is subjected to an electric field and such that, in the absence of any electric field, the molecules are oriented at right angles to the internal walls, for example, (this orientation being indicated by the arrows 132). At the points at which an electric field is applied, that is to say between two opposite strips of the electrodes 124 and 126, the optical axis of the liquid crystals undergoes a rotation which can be adjusted if necessary between 0° and 90°, the value shown in the figure being 90°; the optical axis therefore assumes a direction parallel to the internal walls, this direction being indicated by the arrows 134. When the switch 130 is closed, there is thus obtained a pattern of phase diffraction by transmission, the pitch of said pattern being determined by the distance between two adjacent conductive strips. These liquid crystals 122 are advantageously of the nematic type.

It can be shown by calculation that, by postulating conditions of diffraction known as "Bragg conditions" and by making use of a liquid crystal cell as shown in FIG. 7 and so designed as to provide a phase-displacement equal to $\pi$ between the light rays which pass through the end faces of liquid crystals subjected to an electric field and the light rays which pass through the end faces in the state of rest, said cell accordingly carries out a deflection in the order 1 of diffraction according to the Bragg law with an efficiency of 100 percent, in theory. This is achieved by selecting the thickness d of liquid crystal such that :

$$d \cdot \Delta n = \lambda/2 \text{ wherein}$$

$\lambda$ is the wavelength of the incident light in vacuum and $\Delta n$ is the variation in index of the liquid crystals with and without an applied electric field.

The incident light beam 136 impinges on the entrance face of the cell at an oblique angle of incidence equal to $\theta/2$. This angle is such that it complies with the Bragg condition or, in other words, we must have :

$$\sin \theta/2 = \lambda/2p$$

wherein $p$ is the pitch of the diffraction pattern formed by the conductive strips of the electrodes 124 and 126. The emergent beam passes out of the cell at an angle equal to $\theta/2$. By way of example, in the case of the nematic liquid crystal MBBA [N-(p-methoxybenzylidene) - p-n butylaniline] and in the case of a wavelength of the incident beam equal to 6328 A (light emitted by the helium-neon gas laser), the characteristics of the liquid crystal cell can be as follows:

thickness of liquid crystal d at 34 $\mu$, spacing p between two conductive strips either less than or equal to 3.8 $\mu$, and Bragg angle $\theta/2$ equal to 4°48'.

In all the embodiments described, the incident light beam can advantageously but not necessarily be the light emitted by a laser such as a helium-neon gas laser.

What we claim is:

1. A device for deflecting a light beam, comprising at least one liquid-crystal cell placed on the path of said beam and constituted by a film of liquid crystals interposed between two walls fitted with electrodes between which a potential difference can be applied by suitable means, wherein the incidence of said light beam is oblique with respect to the first wall-liquid crystal interface which is encountered and wherein use is made of liquid crystals for which the refractive index is dependent on the potential difference applied between said electrodes, wherein the electrodes are each formed by an array of identical conductive and transparent strips in parallel relation, the distance between two adjacent strips being equal to the width of the strips and each strip of one of said arrays being located opposite to one strip of the other array, and means for establishing a potential difference between the two electrodes, the establishment of said potential difference being such as to form a diffraction pattern by transmission.

2. A device according to claim 1, wherein the angle of incidence of said light beam on said entrance window and the physical characteristics of said device make it possible to produce a "Bragg reflection".

* * * * *